United States Patent [19]

Ferland et al.

[11] Patent Number: 5,767,502
[45] Date of Patent: Jun. 16, 1998

[54] GRIP-CONFORMING TRIGGER MECHANISM FOR A HAND-HELD BAR CODE SCANNER

[75] Inventors: Albert J. Ferland, Penfield; Christopher J. Lundgren, Victor, both of N.Y.

[73] Assignee: PSC, Inc., Webster, N.Y.

[21] Appl. No.: 735,378

[22] Filed: Oct. 21, 1996

Related U.S. Application Data

[63] Continuation of Ser. No. 607,187, Feb. 26, 1996, abandoned, which is a continuation of Ser. No. 332,014, Oct. 31, 1994, abandoned.

[51] Int. Cl.$^6$ ..................................................... G06K 7/10
[52] U.S. Cl. ............................................. 235/472; 200/522
[58] Field of Search ..................................... 200/329, 332, 200/335, 505, 522; 235/463, 472; 359/214; 222/137, 146, 326; 254/243, 120

[56] References Cited

U.S. PATENT DOCUMENTS

| | | | |
|---|---|---|---|
| 2,452,830 | 11/1948 | Braun. | |
| 3,844,360 | 10/1974 | Green et al. | 173/170 |
| 3,928,739 | 12/1975 | Miyamae | 200/332 |
| 4,270,032 | 5/1981 | Dobberpuhl | 200/332 |
| 4,403,136 | 9/1983 | Colman | 219/317.31 |
| 4,694,182 | 9/1987 | Howard | 235/472 |
| 4,897,532 | 1/1990 | Swartz et al. | 235/467 |
| 5,080,456 | 1/1992 | Katz et al. | 235/472 |
| 5,144,120 | 9/1992 | Krichever et al. | 235/472 |
| 5,203,839 | 4/1993 | Skaggs | 222/137 |
| 5,262,627 | 11/1993 | Shepard | 235/472 |
| 5,428,197 | 6/1995 | McCurry et al. | 200/332 |
| 5,510,589 | 4/1996 | Annal | 200/522 |
| 5,532,467 | 7/1996 | Roustaei | 235/472 |

FOREIGN PATENT DOCUMENTS 186676  5/1992  Taiwan.

*Primary Examiner*—Donald T. Hajec
*Assistant Examiner*—Mark Tremblay
*Attorney, Agent, or Firm*—Foley & Lardner

[57] ABSTRACT

An integrally molded trigger body has a mounting portion received through an opening in an upper portion of a handle of a hand-held bar code scanner and pivotably mounted in the handle under spring bias. The trigger body has a tongue portion extending outwardly of the handle and downwardly beyond the opening toward a grip section of the handle. The tongue portion is contoured to conform with the contour of the grip section when the trigger body is depressed by a user of the scanner so as to actuate the scanning and reading modes.

17 Claims, 3 Drawing Sheets

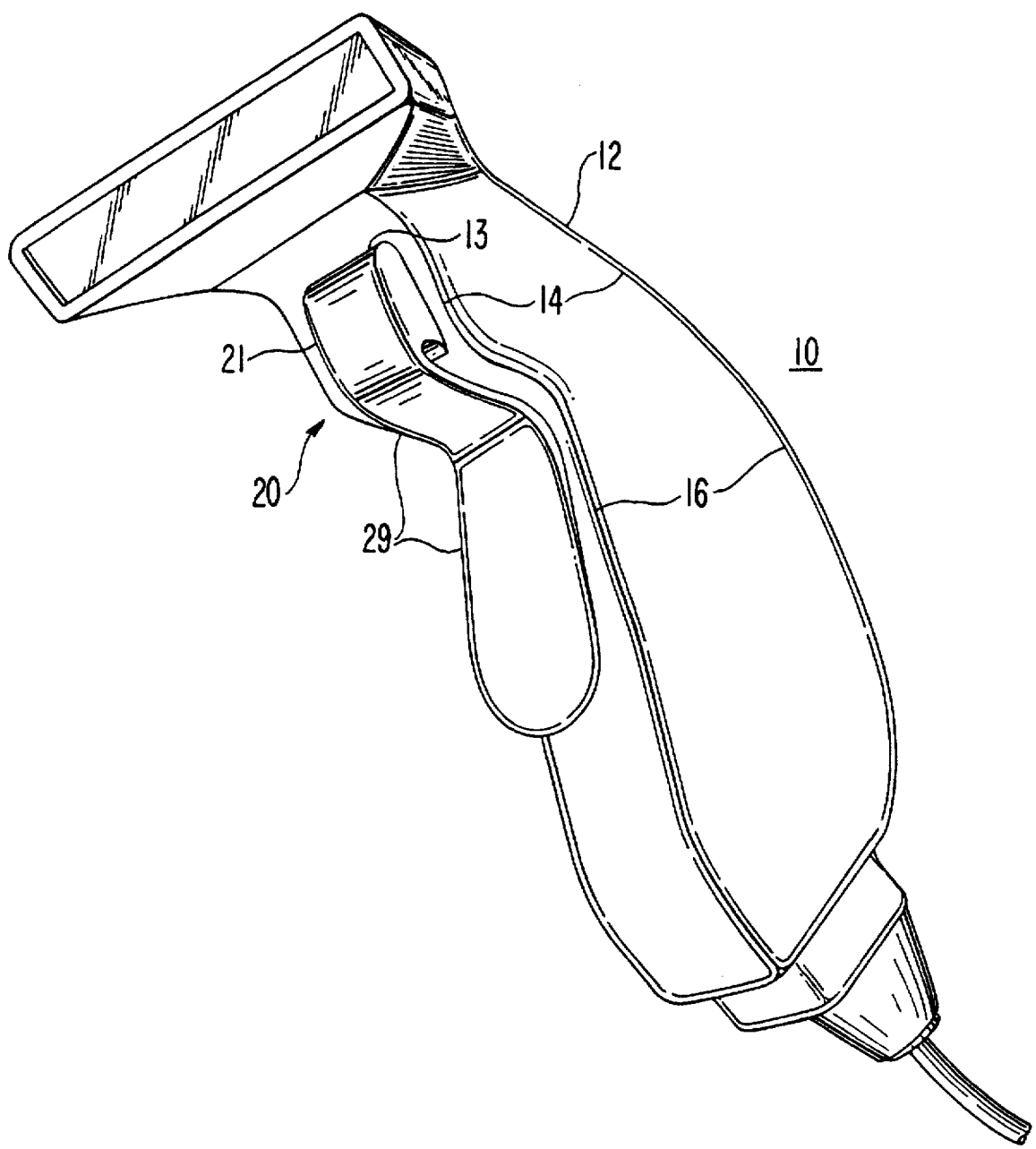

GRIP-CONFORMING TRIGGER MECHANISM FOR A HAND-HELD BAR CODE SCANNER

This application is a continuation of application Ser. No. 08/607,187, filed Feb. 26, 1996 now abandoned, which is a continuation of application Ser. No. 08/332,014, filed Oct. 31, 1994 now abandoned.

FIELD OF THE INVENTION

The present invention generally relates to hand-held bar code scanners, and, more particularly the invention relates to a grip-conforming trigger mechanism for selectably actuating a hand-held bar code scanner, in which the trigger mechanism is ergonometrically advantageous to a user of such bar code scanner.

BACKGROUND OF THE INVENTION

Unitary hand-held bar code scanners and readers are generally well known. Actuation of the scanning and reading modes is typically accomplished by a user by depressing a trigger button or trigger switch. Such a prior art trigger switch is, for example, disclosed in U.S. Pat. No. 5,200,597, issued on Apr. 6, 1993 to Eastman et al, in which a handle portion of the bar code scanner has a trigger button movable into and out of a hole. The trigger button has a bell crank function with a nose engaging a spring-biased switch button which biases the trigger button outwardly of the housing of the bar code scanner. This trigger button and other known trigger buttons for hand-held bar code scanners do not conform in the depressed state to the contour of the handle portion of the scanner, thereby causing discomfort in the index finger of a user who may use such a scanner virtually continuously throughout a working day.

Accordingly, there is a need for an ergonometrically designed trigger mechanism for a hand-held bar code scanner, which trigger mechanism substantially conforms to the contour of a grip portion of a handle of the bar code scanner when depressed by the user, thereby ensuring reduced discomfort in the gripping and actuating and deactuating modes of the scanner. The present invention meets this need.

SUMMARY OF THE INVENTION

The present invention is drawn to grip-conforming trigger and trigger arrangement for a hand-held bar code scanner having a housing, which partly defines a handle, or has a handle. The trigger arrangement includes the trigger, which has a body, a tongue member or portion, and a hinge member or portion. The body has a cavity having a closed end section and an open end section. The cavity is adapted to receive a spring through the open end section and seat the spring in it. The tongue member extends laterally substantially from the body and has a generally concave grip portion. The hinge portion extends from the body substantially away from the tongue member and has at least one pivotal member or pin.

The trigger arrangement includes a trigger mounting section, which can be integral with the housing, adapted to pivotally mount the pivotal member to the housing in a region above the handle.

The body, the tongue member, and the hinge portion can be integrally molded. The length of the tongue member can be at least one-half the length of the handle. The free end of the tongue member can have a segment curved inwardly toward the handle. The tongue member can extend laterally substantially from the closed end section of the body.

The closed end section of the body can include a spring retaining stub extending toward the open end section to secure one end of the spring in the cavity. The open end section of the body can include a flange extending substantially laterally therefrom, which flange is adapted to retain the body in the trigger mounting section of the housing.

The hinge portion can extend away from the tongue member substantially from the open end section of the body. More specifically, the hinge portion can extend laterally along an angular direction from the open end section of the body and can have a pair of laterally extending pins. The trigger mounting section can include means for pivotally receiving the pins, such as seats.

The mounting section of the trigger arrangement can include a wall adjacent the open end section, adapted to retain the spring within the cavity. The spring seated in the cavity is adapted to be compressed between the retaining wall and the closed end section. The trigger arrangement can include a switch-actuating member extending from the open end section, with the retaining wall having an opening to accommodate insertion of the switch-actuating member, which can pass through the opening when the tongue member is pivoted toward the handle to actuate the scanner.

BRIEF DESCRIPTION OF THE DRAWINGS

The present invention will be better understood and appreciated more fully from the following detailed description, taken in conjunction with the accompanying drawings, in which:

FIG. 2 is a frontal perspective view of a hand-held bar code scanner incorporating the currently preferred grip-conforming trigger mechanism in accordance with the present invention.

DETAILED DESCRIPTION OF THE EMBODIMENTS

Figure 1:
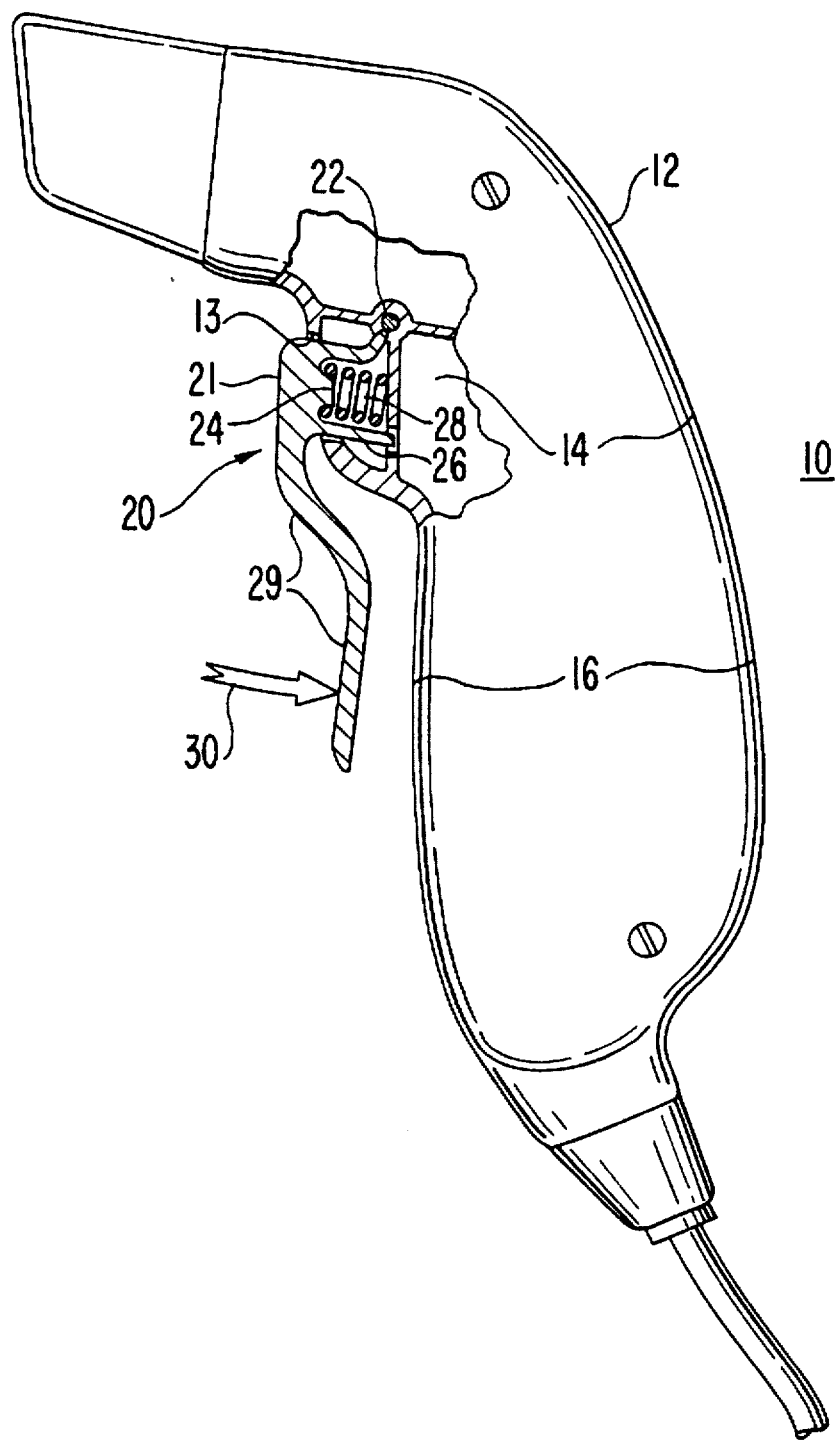
FIG. 1 is a partial sectional side view of a hand-held bar code scanner showing a currently preferred embodiment of the grip-conforming trigger mechanism in accordance with the present invention.

Referring now to FIG. 1, there is shown a partial sectional side view of a hand-held bar code scanner 10 having a housing 12 with a handle portion generally indicated at 14 extending into a grip section 16.

Shown within the sectional detail is a grip-conforming trigger body 20 having a mounting portion 21 and a tongue portion 29. The mounting portion 21 is received through an opening 13 in an upper portion of the handle 14 and is pivotably mounted inside the housing 12 by pivot pins 22 located in mating molded recesses within the housing 12. The mounting portion 21 includes two pivot pins 22, a switch-actuating pin 26 projecting inwardly of the housing 12 to a switch (not shown) when the tongue portion 29 of the trigger body 20 is depressed by a user, and a spring-retaining stub 24. The stub 24 is shown in FIG. 1 as supporting one end of a coil spring 28, whose other end rests against a partitioning wall within the housing 12, thereby urging the trigger body 20 into a deactuating position as depicted in FIG. 1. When a user desires to actuate the bar code scanner, one or two fingers may be used to depress the trigger body 20 along tongue portion 29 so as to exert a force indicated by an arrow 30 on the tongue portion, thus moving the tongue portion 29 into a substantially grip-conforming position and hence, to project the switch-actuating pin 26 toward and into contact with an actuating switch (not shown). The tongue portion is depicted to extend to at least one half of the length dimension of the handle 14 along the grip section 16.

It will be appreciated that a hand-held bar code scanner having a different surface contour of a handle and a grip-section thereof can have an ergonometrically designed grip-conforming trigger mechanism by selecting a contour of the trigger body that conforms with the contour of the handle and its grip section.

Referring now to FIG. 2, there is shown a frontal perspective view of the bar code scanner 10 incorporating the currently preferred trigger body 20 with a mounting portion 21 shown inserted through an opening 13 at an upper portion of handle 14.

In contrast to the prior art trigger button disclosed in the aforementioned U.S. Pat. No. 5,200,597, the trigger body 20 of the present invention extends outwardly and downwardly of the handle 14 and substantially beyond the opening 13 toward the grip section 16, as shown in FIGS. 1 and 2.

Figure 3A:
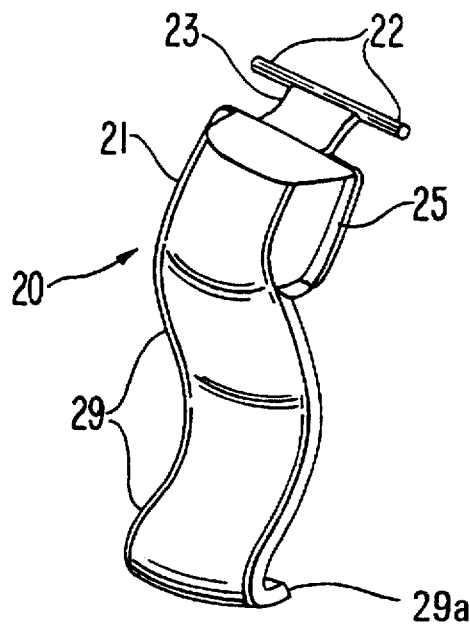
FIG. 3A is a perspective front view of a modified preferred embodiment of an integrally molded trigger body, the modification being a tongue end segment curved inwardly toward the scanner handle.
Figure 3B:
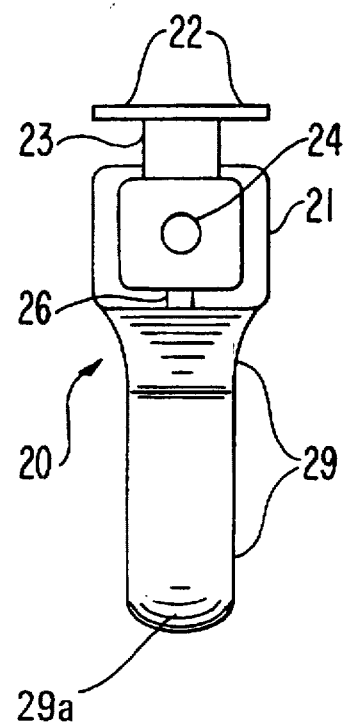
FIG. 3B is a plan rear view of the trigger body shown in FIG. 3A.

FIGS. 3A and 3B show a frontal perspective view and a plan rear view of a slightly modified trigger body 20, respectively. The integrally molded trigger body 20 has pivot pins 22 disposed on a surface 23 angled upwardly from the mounting portion 21. In order to provide additional mechanical retention of the mounting portion 21 in the opening 13, a flange 25 retains the mounting portion 21 within the opening 13 in the housing 12 so as to supplement the retention of the trigger body 20 by the pivot pins 22 in the deactuated state of the trigger body 20. The slight modification of the trigger body 20 of FIGS. 3A and 3B is a tongue end segment 29a curved inwardly toward the scanner handle.

The plan rear view of the trigger body 20 depicted in FIG. 3B further indicates the spring-retaining stub 24 and the switch-actuating pin 26.

Figure 4:
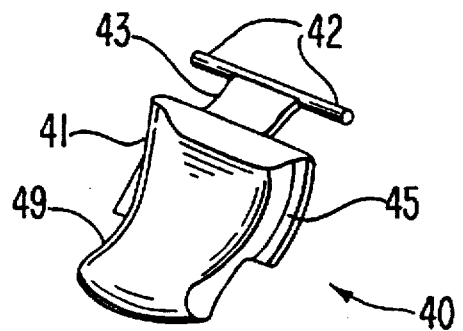
FIG. 4 depicts another embodiment of a grip-conforming trigger body for a hand-held bar code scanner.

In FIG. 4 there is depicted another embodiment of a grip-conforming trigger mechanism in accordance with the invention.

An integrally molded trigger body 40 has pivot pins 42 disposed on an upwardly angled surface 43 that has a lower end terminating in a mounting portion 41 having opposing retaining flanges 45 received on the inside of a housing 12 of a hand-held bar code scanner 10 through an opening 13 in an upper portion of a handle 14 (see FIGS. 1 and 2). A tongue portion 49 conforms to a shorter segment of the grip section 16 as compared to the tongue portions 29 of the trigger body 20 described with reference to FIGS. 1, 2, 3A and 3B, in which the length of the tongue portion was shown to extend by at least one half of the length dimension of the handle 14 in the direction of the grip section 16.

From the foregoing description of the embodiments, it will be apparent that a grip-conforming trigger mechanism for a hand-held bar code scanner has been provided which, through its grip-conforming ergonometric design, affords greater comfort to a user of such a hand-held bar code scanner, particularly during extended periods of use. It is to be understood that the tongue portion of the trigger body of the present invention will be contoured so as to conform to the contour of the grip section of the scanner handle, thereby providing a grip-conforming trigger mechanism. Various modifications of the grip-conforming trigger body may suggest themselves to those skilled in this art. For example, the particular location and disposition of the pivot pins and flanges, as well as the location and shape of the switch-actuating pin and the spring-retaining stub can be varied. Such modifications are within the spirit and scope of the invention, as defined in the claims.

What is claimed is:

1. A grip-conforming trigger arrangement for a hand-held bar code scanner having a housing with a gripping portion, comprising:

a trigger having a body, a grip-conforming elongated tongue member, and a hinge portion; and a trigger mounting section integral with the housing in a region above the gripping portion for pivotally mounting the trigger to the housing, wherein the body has a cavity defined between a closed end section of the body and an open end section of the body, the cavity being adapted to receive a spring through the open end section of the body and seat the spring therein, wherein the elongated tongue member extends generally downwardly from the closed end section of the body, wherein the hinge portion extends generally upwardly from the open end section of the body generally away from the elongated tongue member, the hinge portion having at least one pivotal member, and wherein the trigger mounting section has an opening to permit insertion of the hinge portion so that the elongated tongue member extends generally downwardly from the body and spaced from the gripping portion, with a gap formed between the elongated tongue member and an outer periphery of the gripping portion.

2. A trigger arrangement according to claim 1 wherein the hinge portion extends upwardly along an angle from the open end section of the body.

3. A trigger arrangement according to claim 1, wherein the hinge portion has a pair of laterally extending pins and the trigger mounting section includes means for pivotally receiving the pins.

4. A trigger arrangement according to claim 3, wherein the trigger mounting section includes a wall adjacent the open end section of the body, adapted to retain the spring within the cavity, wherein the spring seated in the cavity is adapted to be compressed between the retaining wall and the closed end section of the body.

5. A trigger arrangement according to claim 4, further comprising a switch-actuating member extending from the open end section of the body and wherein the retaining wall has an opening to accommodate insertion of the switch-actuating member, wherein the switch-actuating member passes through the opening in the retaining wall when the elongated tongue member is pressed toward the gripping portion to actuate the scanner.

6. A trigger arrangement according to claim 1, wherein the closed end section of the body includes a spring retaining stub extending toward the open end section of the body to secure one end of the spring in the cavity.

7. A trigger arrangement according to claim 1, wherein the open end section of the body includes a flange extending substantially laterally therefrom to maintain the body within the housing, with the closed end section of the body extending outwardly from the trigger mounting opening.

8. A trigger arrangement according to claim 1, wherein the length of the elongated tongue member is dimensioned to be at least one-half the length of the gripping portion.

9. A trigger arrangement according to claim 1, wherein the elongated tongue member curves inwardly toward the gripping portion.

10. A trigger arrangement according to claim 1, wherein the body, the elongated tongue member, and the hinge portion are integrally molded.

11. A grip-conforming trigger for a hand-held bar code scanner having a housing with a gripping portion, comprising:

- a body having a cavity defined between a closed end section of the body and an open end section of the body, the cavity being adapted to receive a spring through the open end section of the body and seat the spring therein;
- a grip-conforming elongated tongue member extending generally downwardly from the closed end section of the body; and
- a hinge portion extending generally upwardly from the open end section of the body generally away from the elongated tongue member, the hinge portion having at least one pivotal member adapted to be mounted to the housing through an opening formed in the housing above the gripping portion, wherein the elongated tongue member is adapted to extend generally downwardly from the body and spaced from the gripping portion, with a gap formed between the elongated tongue member and an outer periphery of the gripping portion.

12. A trigger according to claim 11, wherein the hinge portion extends upwardly along an angle from the open end section of the body and has a pair of laterally extending hinge pins.

13. A trigger according to claim 12, wherein the body includes a switch-actuating member extending from an open end section of the body.

14. A trigger according to claim 13, wherein the closed end section of the body includes a spring retaining stub extending toward the open end section of the body to secure one end of the spring in the cavity.

15. A trigger according to claim 14, wherein the open end section includes a flange extending substantially laterally therefrom.

16. A trigger according to claim 11, wherein the elongated tongue member curves inwardly toward the gripping portion.

17. A trigger according to claim 11, wherein the body, the elongated tongue member, and the hinge portion are integrally molded.

* * * * *